Jan. 5, 1937.   J. M. HAIT   2,067,123
TURBINE PUMP HEAD
Filed Aug. 22, 1934
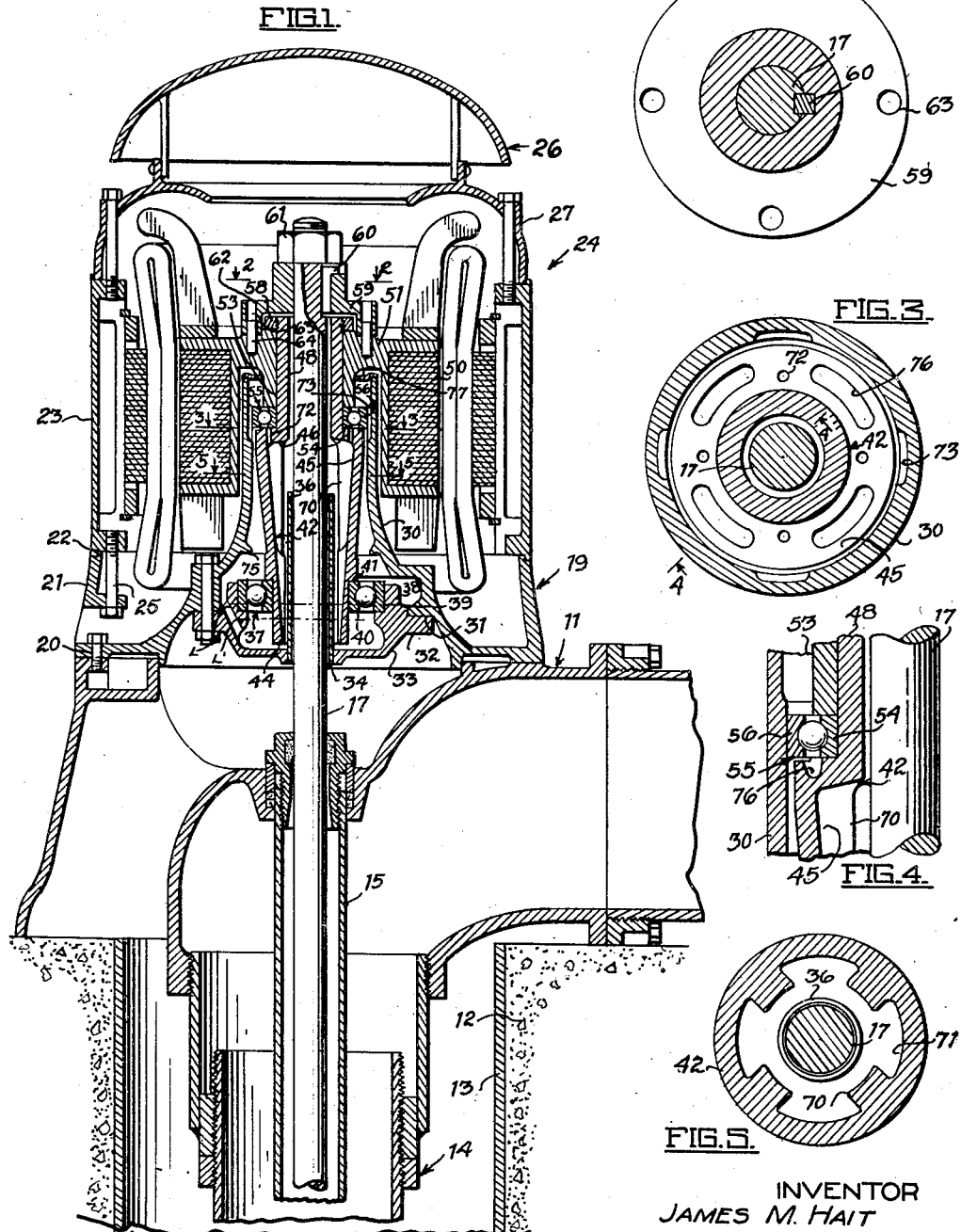
INVENTOR
JAMES M. HAIT
BY
ATTORNEY Patented Jan. 5, 1937

2,067,123

UNITED STATES PATENT OFFICE 2,067,123

TURBINE PUMP HEAD

James M. Hait, San Marino, Calif., assignor to Food Machinery Corporation, a corporation of Delaware Application August 22, 1934, Serial No. 740,923

21 Claims. (Cl. 172—36)

This invention has to do in a general way with well pumps of the so-called turbine type and is more particularly related to that particular class of pumps wherein the pump shaft is directly connected to a motor which is mounted upon the discharge fitting of the pump.

More specifically my invention is related to improvements in the so-called hollow shaft type of connection employed in pumps of this nature. This so-called hollow shaft type of construction is one in which the pump shaft is directly connected, through the medium of suitable fittings, to the rotor of the electric motor whereby the rotor supports and drives the pump shaft. The rotor in turn is mounted upon the so-called hollow shaft which is coaxial with the pump shaft and is in turn supported by suitable thrust and radial bearings.

For convenience in assembling and inspecting units of this character it has heretofore been considered necessary to form the pump head in several sets of sections or elements which are brought into alignment at the time of installation by providing accurately machined surfaces at the various points of connection. One object of this invention is to provide a pump head of the class described wherein one major casting or housing supports all of the elements of the drive assembly. In this way all of the machined surfaces can be machined in one setting of the major casting thereby greatly reducing the cost of manufacturing and assembling the unit. This construction also facilitates the inspection and repair of the pump head during its use.

The lubrication of the bearings in a pump head of this character is another major problem and most manufacturers have resorted to the use of submerged bearings to assure proper lubrication. I have discovered that there is a loss of efficiency to as much one percent due to the churning action in submerged bearings, and it, therefore, becomes a further object of this invention to provide a construction of the class described wherein the hollow shaft itself acts as a pump for delivering lubricant from a lubricant reservoir to the upper bearing, such bearing in turn being arranged and associated with the specially formed housing so as to direct the lubricant from the upper bearing downwardly over the lower bearing and into the lubricant reservoir, thereby avoiding all of the churning action above referred to.

My invention further contemplates the provision of means for providing a supply of lubricant adjacent each of the bearings which is always available during periods of shut down so that the bearings are lubricated immediately upon initiating the operation of the pump.

It is a further important feature of this invention that the hub which supports the rotor from the hollow shaft is formed integrally with the rotor and is provided with a downwardly extending flange which engages the hollow shaft supported radial bearing, thereby leaving sufficient space within the rotor to permit the upward extension of the housing above referred to. In this way I am able to provide a lubricant return reservoir above the top bearing for the hollow shaft.

The details in the construction of a preferred form of my invention, together with other objects attending its production, will be best understood from the following description of the accompanying drawing, which are chosen for illustrative purposes only, and in which Fig. 1 is a sectional elevation showing the discharge fitting of a turbine pump and illustrating the details in the construction of a preferred form of pump head contemplated by this invention;

Fig. 2 is a plan section taken in a plane represented by the line 2—2 of Fig. 1;

Fig. 3 is a plan section taken in a plane represented by the line 3—3 of Fig. 1;

Fig. 4 is a fragmentary enlarged sectional elevation taken on the line 4—4 of Fig. 3; and Fig. 5 is a plan section taken in a plane represented by the line 5—5 of Fig. 1.

More particularly describing the invention as herein illustrated, reference numeral 11 indicates a discharge fitting of a turbine pump. This fitting 11, which may be of any conventional construction, is shown as being mounted upon a foundation 12 above a pump casing 13. The discharge fitting 11 carries a pump tubing generally indicated by reference numeral 14 and a shaft tubing 15 which is provided with a packing gland 16 at its upper end through which the vertical pump shaft 17 extends. Reference numeral 19 indicates a main base fitting or casting which is secured to the discharge fitting 11 through the medium of bolts or screws generally indicated by reference numeral 20.

The casting 19 has an upwardly extending peripheral flange 21, the upper edge of which is machined as indicated at 22 to support the stator unit 23 of a motor which is generally indicated by reference numeral 24. The stator unit 23 is secured to the base flange 19 by means of screws generally indicated at 25. Reference numeral 26 indicates a cover or hood assembly of any conventional construction which is shown as being secured to the stator unit through the medium of screws 27.

Reference numeral 30 indicates what I may term a vertical projection or housing which is cast integrally with the main base fitting 19 and is shown as being flared outwardly at its lower end. The bottom portion of this housing 30 is provided with a machined shoulder 31 which is in turn engaged by a flange 32 on what I may term a cup member 33. The housing 30 and the cup member are coaxial with the pump shaft and the cup member has an opening 34 through which the shaft extends.

As will be later described, the cup member 33 constitutes a lubricant reservoir and in order to avoid the use of packing in the opening 34 I provide in this opening a sleeve 36 which is pressed or otherwise tightly fitted in the opening 34. In addition to acting as lubricant reservoir, the cup member in this form of my invention constitutes a support for what I may term a bottom bearing generally indicated by reference numeral 37. For this purpose I provide the cup member with an upwardly extending annular projection 38 which is machined to receive the outer race 39 of the bearing 37. The inner race 40 of the bearing 37 fits under an annular shoulder 41 formed on a hollow shaft generally indicated by reference numeral 42. The hollow shaft 42 is coaxial with the pump shaft 17 and has what I may term a downwardly extending skirt 44 which extends into the bottom portion of the lubricant reservoir formed in the cup 33. The bottom portion of the hollow shaft 42 is provided with upwardly diverging passages which are formed by making the interior of the hollow shaft upwardly divergent, thereby providing an upwardly divergent chamber 45 which terminates in shoulder means shown as comprising an annular shelf 46 situated at a substantial distance above the bottom bearing 37. That portion 48 of the hollow shaft which extends upwardly from the upper shoulder or annular shelf 46 is shown as being substantially cylindrical in shape.

As has been previously pointed out, this construction is one in which the hollow shaft carries the rotor of the power unit which in turn supports and drives the pump shaft. The rotor in this form of my invention is generally indicated by reference numeral 50 and is shown as having a hub 51 formed integrally therewith, such hub fitting over the cylindrical portion 48 of the hollow shaft and having a downwardly extending flange 53 which rests upon the inner race 54 of a radial bearing 55, which is supported by the shoulder means 46 on the hollow shaft. The outer race 56 of the bearing 55 engages the inner surface of the vertical housing 30 which it will be observed from Fig. 1 extends a substantial distance above the annular shelf and the bearing 55 into the recess formed around the downwardly extending flange 53. It will be observed from Fig. 4 that the outer portion of the annular shelf is lower than the inner portion so as to provide clearance for the outer race 56 of the radial bearing. The hub member 51 is firmly held upon the inner race 57 of the bearing 55 by means of a nut 58 which is threaded on the top of the hollow shaft.

Reference numeral 59 indicates what I may term a connecting plate which fits over the upper end of the pump shaft and is keyed thereto as indicated at 60. The pump shaft is adjustably retained in the connecting plate by means of a nut 61 and the connecting plate 59 is provided with a flange 62 which has a plurality of openings therein as indicated at 63, such openings receiving pins 64 which are mounted in the hub of the rotor. It will be observed that the flange 62 is undercut at its central portion so as to provide ample clearance for the upper end of the hollow shaft and the nut 58. In other words, the weight of the pump shaft is carried directly by the rotor hub, which in turn is fitted over the upper cylindrical portion of the hollow shaft, the hollow shaft in turn being supported by the radial and thrust bearing 37 and the radial bearing 55.

From this description it will be seen that the bearings for the rotor are situated in the vertical housing 30 which is a part of the main casting 19. Such casting also constitutes the support for the stator, thereby providing a construction in which all of the elements of the driving unit are supported from a single main casting.

As has been previously pointed out it is one object of this invention to provide a lubricating system for the bearings wherein the hollow shaft itself acts as a pump for the lubricant. I accomplish this object by providing the wall of the hollow shaft with passages which are divergent relative to the axis of the shaft. In this form of my invention this is accomplished by providing the upwardly divergent chamber 45 in the hollow shaft with a plurality of ribs 70 which extend longitudinally of the chamber and form grooves 71 therebetween. These grooves are preferably formed so that they gradually decrease in depth as they approach the bottom of the hollow shaft.

Inasmuch as the bottom of the hollow shaft is always submerged in oil in the lubricant reservoir, it will be seen that during the high speed rotation of the shaft assembly as the pump is being operated, the lubricant will be lifted from the reservoir, due to the impeller action of the ribs 70, following along the outer surfaces of the grooves 71 to the top of the hollow chamber 45. The lubricant traveling upwardly in this manner passes out through the ports 72 which are formed in the annular shelf below the bearing 55, lubricating such bearing and being thrown upwardly thereover in the space between the upper end of the housing 30 and the downwardly extending hub flange 53. This lubricant passes downwardly through grooves or slots 73 formed in the wall of the housing 30 behind the outer race 56 of the top bearing, and then flows or drops downwardly over the lower bearing 37 into the lubricant reservoir. I may, if desirable, provide the lower portion of the wall of the housing with an inwardly projecting lip 75 which acts to insure the lubricant falling over the bearing 37.

I prefer to maintain sufficient lubricant in the reservoir so that it will partially submerge the bottom bearing as indicated at L when the pump is stationary. When the unit is in operation, however, part of this lubricant is carried upwardly by the pump action of the hollow shaft so that the level drops down to L' where the bearings are clear of the main body of lubricant. I thereby eliminate the usual churning action which takes place in a completely submerged bearing and have been able to increase the efficiency of the pump substantially one per cent.

In order that the top bearing may have lubricant available after the unit has been stopped, and before the lubricant can be pumped up to the top bearing, I provide the annular shelf with a plurality of recesses or wells generally indicated by reference numeral 76. It will be seen that as the pump stops the lubricant on the bearing 55 will drip into these wells and will be available to be thrown out into the bearing when the pump is again started.

Reference numeral 77 indicates a splash cap which may be provided on the top of the housing 30 to prevent lubricant being thrown over the upper edge of the housing. I find, however, that if the parts are proportioned substantially as shown in Fig. 1, this particular element may be dispensed with, although it might prove of value where the distance between the bearing and the top of the housing was shorter than that shown.

It will be apparent from the foregoing description that the device contemplated by this invention is of simple form and construction and that it incorporates features which will reduce the cost of manufacture in pump heads of this nature and will facilitate the installation and inspection of the unit, furthermore, it provides in the hollow shaft itself an oil pump which must always operate when the pump is in use, and which assures lubrication of the bearings without the usual churning action occurring in submerged bearings.

It is to be understood that the term "rotor", as used herein, except where specifically mentioned in combination with a "stator", is to be given its broadest interpretation and will include any rotatable element, such as a pulley or gear, which may be used to drive the pump shaft. It is to be further understood that while I have herein described and illustrated one preferred form of my invention the invention is not limited to the precise construction described above but includes within its scope whatever changes fairly come within the spirit of the appended claims.

I claim as my invention:

1. For use in combination with a turbine pump having a discharge fitting and a vertical pump shaft extending through said discharge fitting, a power unit embodying: a base fitting mounted on said discharge fitting and having a vertical housing surrounding said shaft; a bearing mounted in the bottom of said housing; a hollow shaft supported in said bearing and surrounding said pump shaft; a second bearing having an inner race supported on said hollow shaft at a substantial distance above said first mentioned bearing and having an outer race engaging the interior of said housing; a rotor unit having a hub fitted on the upper end of said hollow shaft, said hub having a downwardly projecting flange engaging the inner race of said second bearing; a driving connection interposed between said rotor and said pump shaft; a stator unit mounted on said base fitting and surrounding said rotor; a lubricant reservoir in said housing below said bottom bearing; means within said hollow shaft operable during the rotation thereof for delivering lubricant from said reservoir to said second bearing, said housing being formed so as to direct lubricant so delivered downwardly over said bottom bearing; and a skirt member on the bottom of said hollow shaft extending downwardly below said bottom bearing, whereby the lubricant level in said reservoir is maintained below said bottom bearing during the operation of said pump.

2. For use in combination with a turbine pump having a discharge fitting and a vertical pump shaft extending through said discharge fitting, a power unit embodying: a base fitting mounted on said discharge fitting and having a vertical housing surrounding said shaft; a bottom bearing mounted in the bottom of said housing; a hollow shaft supported in said bottom bearing and surrounding said pump shaft; an upper bearing having an inner race mounted on said hollow shaft at a substantial distance above said bottom bearing and having an outer race engaging the interior of said housing; a rotor unit having a hub fitted on the upper end of said hollow shaft, said hub having a downwardly projecting flange engaging the inner race of upper bearing; a driving connection interposed between said rotor and said pump shaft; a stator unit mounted on said base fitting and surrounding said rotor; a lubricant reservoir in the bottom of said housing below said bottom bearing; and means comprising an upwardly divergent ribbed chamber in said hollow shaft terminating in openings below said upper bearing whereby the rotation of said hollow shaft will deliver lubricant from said reservoir to said upper bearing; said housing being formed so as to return said lubricant from said upper bearing over said bottom bearing to said reservoir.

3. In a turbine pump having a vertical pump shaft, a stator and a rotor, a hub formed integrally with said rotor and spaced above a horizontal plane central to the laminations of said rotor; a downwardly extending flange on said hub; a base fitting supporting said stator and having a vertical central housing which extends above the lower edge of said flange; means engaging said rotor hub for supporting and driving said pump shaft; means for supporting said rotor comprising a hollow shaft having its upper end fitted into said hub, shoulder means on said hollow shaft below said flange, an upper bearing having its inner race interposed between said shoulder and the bottom of said flange, and a bottom bearing in the bottom of said housing supporting said hollow shaft; a lubricant reservoir in the bottom of said housing; means within said hollow shaft operable during the rotation thereof for delivering lubricant from said reservoir to said upper bearing; and a skirt member on the bottom of said hollow shaft extending downwardly below said bottom bearing, whereby the lubricant level in said reservoir is maintained below said bottom bearing during the operation of said pump.

4. In a turbine pump: a vertical pump shaft; a motor having a stator and a hollow rotor concentric with said shaft; a hub on said rotor having a downwardly projecting flange; a driving connection interposed between the top of said hub and said pump shaft; a base fitting supporting said stator and having a central housing with its upper end extending into said rotor above the bottom of said flange; a hollow shaft having its upper end fitted into said hub; a bearing for said hollow shaft in the bottom of said housing; shoulder means on said hollow shaft below said hub; a radial bearing interposed between said shoulder and said hub and engaging the interior of said housing; a lubricant reservoir in said housing below said bottom bearing; means in said hollow shaft, operable during the rotation thereof for carrying lubricant upwardly from a point in said reservoir below said bottom bearing through openings in said shoulder to said upper bearing; a splash cap on the top of said housing; and means in said housing for directing lubricant downwardly past said upper bearing and through said bottom bearing into the bottom of said housing.

5. In a turbine pump: a vertical pump shaft; a motor having a stator and a hollow rotor concentric with said shaft; a hub on said rotor having a downwardly projecting flange; a driving connection interposed between the top of said hub and said pump shaft; a base fitting supporting said stator and having a central housing with its upper end extending into said rotor above the bottom of said flange; a hollow shaft having its upper end fitted into said hub; a bearing for said hollow shaft in the bottom of said housing; an annular shelf on said hollow shaft below said hub; a radial bearing interposed between said shelf and said hub and engaging the interior of said housing; a lubricant reservoir in said housing below said bottom bearing; said hollow shaft having its lower end submerged in said lubricant reservoir; an upwardly divergent chamber extending up into said hollow shaft and terminating below said shelf; longitudinal grooves in the wall of said chamber; and ports through said shelf communicating with said grooves.

6. In combination with the vertical shaft of a turbine pump: a base fitting having a vertical housing concentric with said shaft; a bearing in the bottom of said housing; a lubricant reservoir in the bottom of said housing below said bottom bearing; a hollow shaft concentric with said pump shaft; pump shaft driving means mounted on the upper end of said hollow shaft, said hollow shaft having a bottom shoulder engaging said bottom bearing and a downwardly projecting skirt extending below said shoulder into said reservoir; an upper shoulder on said hollow shaft at a substantial distance above said bottom shoulder; an upper bearing mounted on said upper shoulder and engaging the interior of said housing, said hollow shaft being formed with an upwardly divergent chamber opening through said skirt into said reservoir at a point below said bottom bearing; and longitudinal grooves in the wall of said chamber, said upper shoulder having ports communicating with said grooves.

7. A hollow shaft of the class described comprising a top section, shoulder means at the base of said top section adapted to support a bearing; a downwardly convergent chamber below said shoulder means; grooves in the inner wall of said chamber; and openings through said shoulder means communicating with said grooves, said shoulder being provided with wells situated between said openings.

8. In a turbine pump: a vertical pump shaft; a motor having a stator and a hollow rotor concentric with said shaft; a hub on said rotor having a downwardly projecting flange; a driving connection interposed between the top of said hub and said pump shaft; a base fitting supporting said stator and having a central housing with its upper end extending into said rotor above the bottom of said flange; a hollow shaft having its upper end fitted into said hub; a bearing for said hollow shaft in the bottom of said housing; an annular shelf on said hollow shaft below said hub; a radial bearing interposed between said shelf and said hub and engaging the interior of said housing; a lubricant reservoir in said housing below said bottom bearing; and means in said hollow shaft, operable during the rotation thereof for carrying lubricant from said reservoir through ports in said shelf to said upper bearing; said shelf being provided with wells below said top bearing for retaining lubricant when said shaft is idle.

9. In a turbine pump the combination of: a vertical pump shaft; a stationary housing surrounding a portion of said pump shaft; a hollow shaft surrounding said pump shaft in said housing; vertically spaced bearings in said housing supporting said hollow shaft; a lubricant reservoir in said housing below the lowermost bearing; means within said hollow shaft and operable during the rotation thereof for pumping lubricant from said reservoir to one of said bearings; and a skirt on the bottom of said hollow shaft extending downwardly below said lowermost bearing whereby the lubricant level in said reservoir may be maintained below said lowermost bearing during the rotation of said hollow shaft.

10. For use in combination with a turbine pump having a discharge fitting and a vertical pump shaft extending therethrough, a shaft drive assembly embodying: a base fitting mounted on said discharge fitting and having a vertical housing surrounding said shaft; a bearing in the bottom of said housing; a hollow shaft supported in said bottom bearing and surrounding said pump shaft; an upper bearing having an inner race supported at an intermediate point on said hollow shaft and an outer race engaging the interior of said housing; means supported by and rotatable with said hollow shaft for rotating said pump shaft; a lubricant reservoir in said housing below said bottom bearing; means comprising an upwardly divergent axial passage in said hollow shaft terminating in an opening below said upper bearing for delivering lubricant from said reservoir to said bearing during the rotation of said hollow shaft; and a skirt member on the bottom of said hollow shaft extending downwardly below said bottom bearing, whereby the lubricant level in said reservoir is maintained below said bottom bearing during the operation of said pump.

11. For use in combination with a turbine pump having a discharge fitting and a vertical pump shaft extending therethrough, a shaft drive assembly embodying: a base fitting mounted on said discharge fitting and having a vertical housing surrounding said shaft; a bearing in the bottom of said housing; a hollow shaft supported in said bottom bearing and surrounding said pump shaft; an upper bearing interposed between said hollow shaft and the interior of said housing at an intermediate point on said hollow shaft; means supported by and rotatable with said hollow shaft for rotating said pump shaft; a lubricant reservoir in said housing below said bottom bearing; means in said hollow shaft, operable during the rotation thereof for lifting lubricant from said reservoir to a point adjacent said upper bearing, the wall of said hollow shaft being ported so as to deliver said lubricant into said upper bearing; and a skirt member on the bottom of said hollow shaft extending downwardly below said bottom bearing, whereby the lubricant level in said reservoir is maintained below said bottom bearing during the operation of said pump.

12. For use in combination with a turbine pump having a discharge fitting and a pump shaft extending downwardly therethrough, a shaft drive assembly embodying: a base fitting mounted on said discharge fitting and having a vertical housing surrounding said shaft; a bearing in the bottom of said housing; a hollow shaft supported in said bottom bearing and surrounding said pump shaft; an upper bearing interposed between said hollow shaft and the interior of said housing at an intermediate point on said hollow shaft; means supported by and rotatable with said hollow shaft for rotating said pump shaft; a lubricant reservoir in said housing below said bottom bearing; means comprising a passage in said hollow shaft diverging upwardly relative to the axis of said hollow shaft and terminating in an opening adjacent said upper bearing whereby the rotation of said hollow shaft will deliver lubricant from said reservoir to said upper bearing; and a skirt member on the bottom of said hollow shaft extending downwardly below said bottom bearing, whereby the lubricant level in said reservoir is maintained below said bottom bearing during the operation of said pump.

13. For use in combination with a turbine pump having a discharge fitting and a pump shaft extending downwardly therethrough, a shaft drive assembly embodying: a base fitting mounted on said discharge fitting and having a vertical housing surrounding said shaft; a bearing in the bottom of said housing; a hollow shaft supported in said bottom bearing and surrounding said pump shaft; an upper bearing interposed between said hollow shaft and the interior of said housing at an intermediate point on said hollow shaft; means supported by and rotatable with said hollow shaft for rotating said pump shaft; a lubricant reservoir in said housing below said bottom bearing; means comprising an upwardly divergent ribbed chamber in said hollow shaft terminating in openings adjacent said upper bearing whereby the rotation of said hollow shaft will deliver lubricant from said reservoir to said upper bearing; said housing being formed so as to return said lubricant from said upper bearing over said bottom bearing to said reservoir, and a skirt member on the bottom of said hollow shaft extending downwardly below said bottom bearing, whereby the lubricant level in said reservoir is maintained below said bottom bearing during the operation of said pump.

14. For use in combination with a turbine pump having a discharge fitting and a pump shaft extending downwardly therethrough, a shaft drive assembly embodying a base fitting mounted on said discharge fitting and having a vertical housing surrounding said shaft; a bearing in the bottom of said housing; a hollow shaft supported in said bottom bearing and surrounding said pump shaft; an upper bearing interposed between said hollow shaft and the interior of said housing at an intermediate point on said hollow shaft; means supported by and rotatable with said hollow shaft for rotating said pump shaft; a lubricant reservoir in said housing below said bottom bearing; means comprising an upwardly divergent ribbed chamber in said hollow shaft terminating in openings adjacent said upper bearing whereby the rotation of said hollow shaft will deliver lubricant from said reservoir to said upper bearing; and a skirt member on the bottom of said hollow shaft extending downwardly below said bottom bearing, whereby the lubricant level in said reservoir is maintained below said bottom bearing during the operation of said pump.

15. In a turbine pump having a vertical pump shaft and a rotor for driving same; a hub on said rotor; a base fitting having a vertical housing surrounding said shaft; a bearing in the bottom of said housing; a hollow shaft supported in said bearing and supporting said rotor on its upper end; shoulder means on said hollow shaft at a substantial distance above said bottom bearing; an upper bearing having its inner race supported on said shoulder; a lubricant reservoir in said housing below said bottom bearing; means within said hollow shaft operable during the rotation thereof for delivering lubricant from said reservoir to said upper bearing; and a skirt member on the bottom of said hollow shaft extending downwardly below said bottom bearing, whereby the lubricant level in said reservoir is maintained below said bottom bearing during the operation of said pump.

16. In a turbine pump: a vertical pump shaft; shaft driving means including a hollow rotor concentric with said shaft; a hub on said rotor; a driving connection interposed between said hub member and said pump shaft; a base fitting having a central housing with its upper end extending into said rotor; a hollow shaft in said central housing with its upper end extending into and supporting said hub member; a bearing for said hollow shaft in the bottom of said housing; shoulder means on said hollow shaft above said bottom bearing; an upper bearing mounted on said shoulder; a lubricant reservoir in said housing below said bottom bearing; means in said hollow shaft, operable during the rotation thereof for carrying lubricant from said reservoir through openings in said shoulder to said upper bearing; and a skirt member on the bottom of said hollow shaft extending downwardly below said bottom bearing, whereby the lubricant level in said reservoir is maintained below said bottom bearing during the operation of said pump.

17. In a turbine pump: a vertical pump shaft; shaft driving means including a stator and a hollow rotor concentric with said shaft; a hub member on said rotor; a driving connection interposed between said hub member and said pump shaft; a base fitting supporting said stator and having a central housing with its upper end extending into and supporting said hub member; a bearing for said hollow shaft in the bottom of said housing; shoulder means on said hollow shaft above said bottom bearing; an upper bearing mounted on said shoulder; a lubricant reservoir in said housing below said bottom bearing; means in said hollow shaft, operable during the rotation thereof for carrying lubricant from said reservoir through openings in said shoulder to said upper bearing; and a skirt member on the bottom of said hollow shaft extending downwardly below said bottom bearing, whereby the lubricant level in said reservoir is maintained below said bottom bearing during the operation of said pump.

18. In a drive mechanism for use with turbine pumps, a vertical drive shaft, a rotor associated therewith for driving the same, a hollow supporting shaft surrounding said drive shaft and rotatable therewith, vertically spaced bearings rotatably supporting said hollow shaft, a lubricant reservoir into which the lower end of said hollow shaft projects, and means functioning with the rotation of said hollow shaft to elevate lubricant through the shaft for delivery to the upper of said bearings, said hollow shaft being formed so as to extend downwardly a substantial distance below the lowermost of said bearings, whereby the lubricant level in said reservoir may be maintained below said bearings during the operation of said drive mechanism.

19. In a drive mechanism for use with turbine pumps, a vertical drive shaft, a rotor associated therewith for driving the same, a hollow supporting shaft surrounding said drive shaft and rotatable therewith, vertically spaced bearings rotatably supporting said hollow shaft, a lubricant reservoir into which the lower end of said hollow shaft projects, impeller means within said hollow shaft for elevating lubricant through the shaft upon rotation thereof, and a passage communicating with the interior of said hollow shaft for conducting lubricant therefrom to the upper of said bearings, said hollow shaft being formed so as to extend downwardly a substantial distance below the lowermost of said bearings, whereby the lubricant level in said reservoir may be maintained below said bearings during the operation of said drive mechanism.

20. In a drive mechanism for use with turbine pumps, a vertical drive shaft, a rotor associated therewith for driving the same, a hollow supporting shaft surrounding said drive shaft and rotatable therewith, vertically spaced bearings rotatably supporting said hollow shaft, a lubricant reservoir into which the lower end of said hollow shaft projects, and means functioning with the rotation of said hollow shaft to elevate lubricant through the shaft for delivery to said bearings, said hollow shaft being formed so as to extend downwardly a substantial distance below the lowermost of said bearings, whereby the lubricant level in said reservoir may be maintained below said bearings during the operation of said drive mechanism.

21. In a drive mechanism for use with turbine pumps, a vertical drive shaft, a rotor associated therewith for driving the same, a hollow supporting shaft surrounding said drive shaft and rotatable therewith, vertically spaced bearings rotatably supporting said hollow shaft, a lubricant reservoir into which the lower end of said hollow shaft projects, and means functioning with the rotation of said hollow shaft to elevate lubricant through the shaft, said hollow shaft being ported to discharge lubricant therefrom for application to said bearings, and the lower end of said hollow shaft projecting downwardly beyond the lowermost of said bearings whereby the lubricant level in said reservoir may be maintained below said bearings during operation of said drive shaft.

JAMES M. HAIT.